United States Patent [19]

Afanador et al.

[11] 3,852,872

[45] Dec. 10, 1974

[54] METHOD OF MAKING A KNUCKLE ASSEMBLY

[75] Inventors: Carlos P. Afanador, Centerville; Richard L. Jones, West Carrolton, both of Ohio

[73] Assignee: Dayton-Walther Corporation, Dayton, Ohio

[22] Filed: Sept. 13, 1973

[21] Appl. No.: 396,848

Related U.S. Application Data

[62] Division of Ser. No. 297,222, Oct. 13, 1972, Pat. No. 3,801,124.

[52] U.S. Cl. .............................. 29/447, 29/DIG.35
[51] Int. Cl. ............................................ B23p 11/02
[58] Field of Search......... 29/447; 280/96.1, 96.2 R, 280/93; 188/18 R

[56] References Cited
UNITED STATES PATENTS

| 10,776 | 11/1886 | Gracey | 29/447 |
| 1,611,453 | 12/1926 | Johnson | 280/93 |
| 1,693,838 | 12/1928 | Faudi | 29/447 |
| 2,623,613 | 12/1952 | Booth | 188/18 R |
| 2,771,301 | 11/1956 | Booth et al. | 280/96.2 R |
| 3,423,104 | 1/1969 | Beach et al. | 280/96.1 |

*Primary Examiner*—Charlie T. Moon
*Attorney, Agent, or Firm*—Biebel, French & Bugg

[57] ABSTRACT

A knuckle assembly in which the upper knuckle, steering arm and brake rails are formed as a one piece casting and the spindle and lower knuckle are formed as in integral forging. The spindle is then shrink fitted into a spindle opening machined in the casting with the lower knuckle positioned correctly relative to the upper knuckle and then finished to receive a lower ball joint.

4 Claims, 5 Drawing Figures

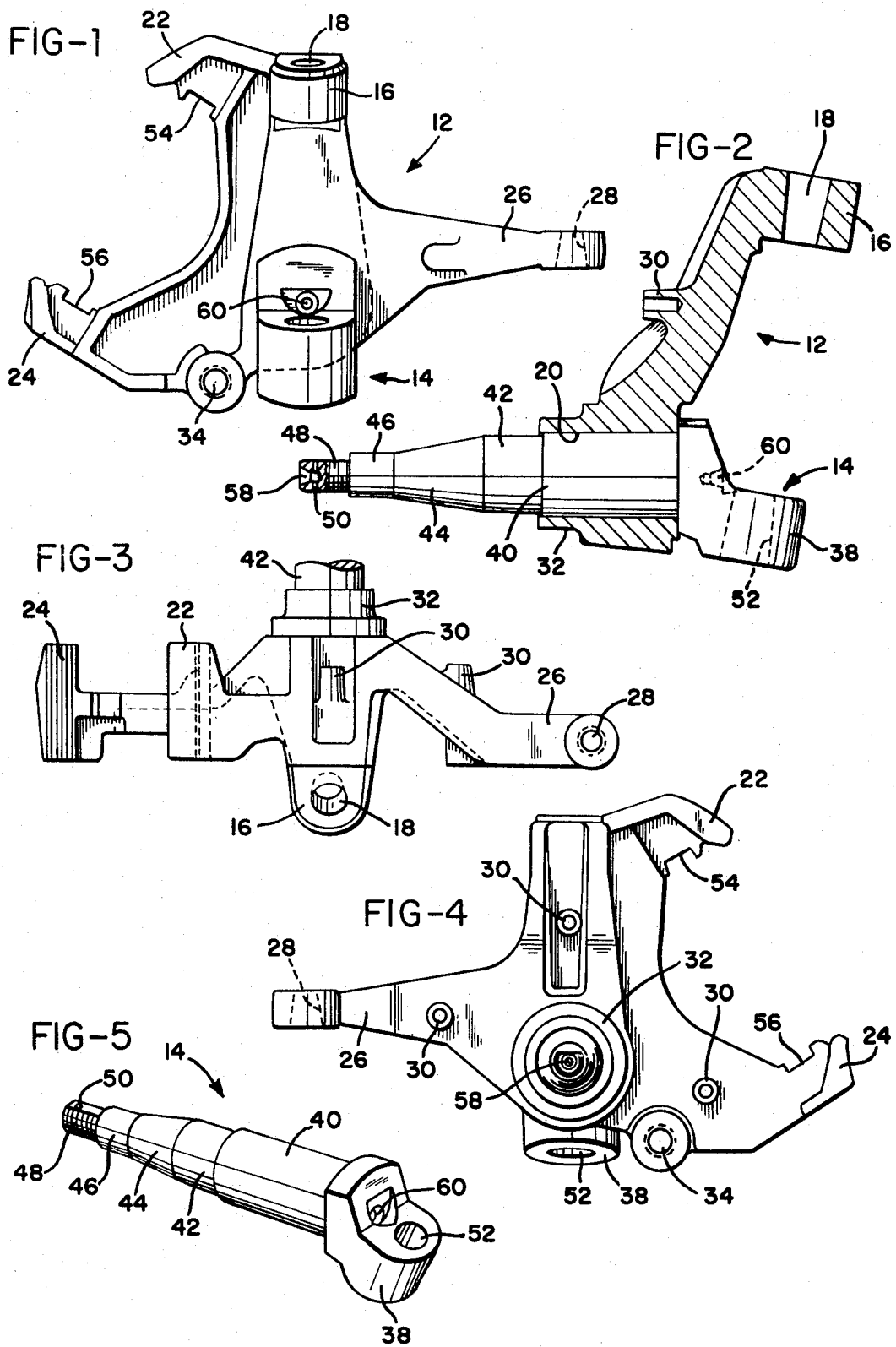

3,852,872

METHOD OF MAKING A KNUCKLE ASSEMBLY

This is a division of application Ser. No. 297,222, filed Oct. 13, 1972, now U.S. Pat. No. 3,801,124.

BACKGROUND OF THE INVENTION

In front suspensions of the independent type, a composite casting is generally utilized as a knuckle assembly in which the various components are bolted together. A case hardened spindle for mounting the wheels is then received in an opening in one portion of the composite casting. A knuckle assembly of this type may utilize a dozen or more parts which must be assembled before installation of the knuckle assembly in the vehicle for which it was designed.

A somewhat simplified version of a knuckle assembly utilizes a casting in which the upper and lower knuckles are cast together and an opening is formed through this casting intermediate the upper and lower knuckles to receive a headed or flanged spindle. While an assembly of this type provides an appreciable simplification over a multi-components assembly, the spacing between the upper and lower knuckles must be sufficient to allow the spindle receiving opening to be formed therebetween. Otherwise, the spindle could not be installed in the casting.

SUMMARY OF THE INVENTION

The present invention provides a knuckle assembly which includes only two basic components. Thus, a one piece casting is formed which includes the upper knuckle, brake rails, steering arm, grease seal boss, steering stop boss and dust shield mounting bosses. A spindle opening is machined in the casting to receive the spindle of an integral forged spindle and lower knuckle.

The spindle is shrink fitted into the spindle opening machined in the base casting with an applied force to a flange portion of the spindle to insure spindle seating, and the lower knuckle is thereafter drilled and machined to provide a ball joint opening positioned in the desired relationship to the ball joint opening in the upper knuckle.

BRIEF DESCRIPTION OF THE DRAWINGS

FIG. 1 is a side view of the assembly, partly in section;

FIG. 2 is an end view of the knuckle assembly of the present invention;

FIG. 3 is a top view thereof;

FIG. 4 is a view from the opposite end from that shown in FIG. 1; and

FIG. 5 is a perspective view of an integral spindle and lower knuckle.

DESCRIPTION OF THE PREFERRED EMBODIMENT

As best seen in FIGS. 1 and 2 of the drawings, the assembly of the present invention includes two basic components. These are a base casting 12 and an integral spindle and lower knuckle 14. The base casting is formed with an upper knuckle 16 projecting outwardly thereof and having a ball joint opening 18 formed therein. A spindle opening 20 is machined through the casting such that the axis thereof is in angularly disposed, intersecting relationship to the axis of the opening 18.

Also formed intergrally on the casting are upper and lower brake rails 22 and 24, respectively, and a steering arm 26 projecting from the casting oppositely to the brake rails. The opening 18 through the knuckle 16 is tapered inwardly toward the lower knuckle 14, and it will be particularly noted from FIG. 1 of the drawings that a tapered opening 28 is also provided in the end of the steering arm 26.

The casting 12 also includes three dust shield mounting bosses 30 projecting from the casting in a direction opposite to the upper knuckle 16 and a grease seal boss 32 extending from the same side of the casting as the bosses 30. A tapped hole 34 is formed in the casting in spaced, substantially parallel relationship to the spindle opening 20 and is designed to receive a steering mount stop.

The integral spindle and lower knuckle 14 is constructed as a one piece forging that includes, as best seen in FIG. 5, a tempered and case hardened spindle 36 having the lower knuckle 38 formed integrally therewith adjacent one end thereof. The spindle itself includes a shrink fit section 40, an inside bearing section 42, a conical connecting portion 44, an outside bearing section 46, and a threaded portion 48 having a cotter pin hole 50 drilled therethrough. The lower knuckle 38 is provided with a ball joint opening 52 which tapers inwardly upwardly, as best seen in FIGS. 2 and 5 of the drawings.

In constructing the knuckle assembly of the present invention, the base casting, including the upper knuckle, brake rails, steering arm, dust shield mounting bosses, steering stop mounting boss, and grease seal section are formed by casting of a material such as ductile iron of grade SAE 4512.

The brake rails 22 and 24 and inner brake shoe locating slots 54 and 56 are then machined or broached to their final configuration and dust shield mounting holes are drilled in the bosses 30. The opening 28 is then drilled in the steering arm, after which the steering stop mounting hole 34 and upper knuckle ball joint hole 18 are drilled. The spindle hole 20 is next machined, completing the base casting.

The integral spindle and lower knuckle 14 is formed by hot forging and the end 48 of the spindle is then threaded and drilled to form the cotter pin hole 50. The spindle is then subjected to tempering and hardening to Rockwell C45 – 50 surface hardness. Next all sections are subjected to grinding and polishing to final diameter and tapers. The area adjacent the spindle opening 20 of the casting 12 is induction heated, the spindle inserted thereinto and the assembly quenched to provide a shrink fitting of the forging 14 in the casting 12. The assembled knuckle is then turned on centers 58 and 60 to burnish grease seal boss 32.

The lower knuckle 38 is, of course, positioned relative to upper knuckle 16 before the assembly is quenched. However, any misalignment, within limits, may be compensated for in the subsequent machining of the lower knuckle 38 and the drilling of the lower ball joint hole 52 to position it properly with respect to the upper ball joint opening 18 so that the two openings are positioned in opposing relationship to each other.

From the above it will be seen that the present invention provides a knuckle assembly and method of manufacturing it which is greatly simplified with respect to multi-component knuckle assemblies and which permit the positioning of the lower knuckle adjacent the point where the spindle projects from the assembly.

While the method and form of article herein described constitute preferred embodiments of the invention, it is to be understood that the invention is not limited to this precise method and form of article, and that changes may be made therein without departing from the scope of the invention.

What is claimed is:

1. A method of forming a knuckle assembly comprising:
   a. casting a one piece base member having a first knuckle projecting outwardly thereof,
   b. forming an opening through said first knuckle,
   c. forming a spindle opening through said casting with the axis thereof disposed in angular intersecting relationship with said opening through said first knuckle,
   d. forging an integral spindle and knuckle, and
   e. fixing said spindle in said spindle opening.

2. The method of claim 1 further comprising:
   a. forming an opening in said second knuckle in opposition to said opening in said first knuckle.

3. The method of claim 1 wherein said step of fixing said spindle in said spindle opening comprises:
   a. shrink fitting said spindle into said spindle opening.

4. The method of forming a knuckle assembly comprising:
   a. casting a one piece base member having:
      i. an upper knuckle projecting outwardly thereof,
      ii. a plurality of dust shield mounting bosses projecting from an opposite side thereof,
      iii. upper and lower brake rails, and
      iv. a steering arm projecting from said casting oppositely to said brake rails,
   b. drilling a steering stop mounting opening into said casting,
   c. drilling a ball joint opening through said upper knuckle,
   d. forming a spindle opening through said casting in spaced, substantially parallel relationship to said steering stop mounting opening,
   e. forging an integral spindle and knuckle, having:
      i. a spindle, and
      ii. a lower knuckle formed integrally on one end of said spindle,
   f. hardening and tempering said spindle,
   g. shrink fitting said spindle in said spindle opening, and
   h. drilling said lower knuckle to provide a ball joint opening therein in opposition to said ball joint opening in said upper knuckle.

* * * * *